United States Patent [19]

Tysak et al.

[11] Patent Number: 5,428,107
[45] Date of Patent: * Jun. 27, 1995

[54] SILANE-MODIFIED FLOOR FINISH VEHICLES

[75] Inventors: Theodore Tysak, Philadelphia; William J. Rosano, Hatboro, both of Pa.

[73] Assignee: Rohm and Haas Company, Philadelphia, Pa.

[*] Notice: The portion of the term of this patent subsequent to Jun. 20, 2012 has been disclaimed.

[21] Appl. No.: 144,952

[22] Filed: Oct. 29, 1993

[51] Int. Cl.⁶ .............................................. C08F 8/32
[52] U.S. Cl. .................................... 525/102; 428/447
[58] Field of Search ......................... 428/447; 525/102

[56] References Cited

U.S. PATENT DOCUMENTS

| | | |
|---|---|---|
| 3,328,325 | 6/1967 | Zdanowski . |
| 3,467,610 | 9/1969 | Fiarman et al. . |
| 4,150,005 | 4/1979 | Gehman et al. . |
| 4,626,567 | 12/1986 | Chang . |
| 4,960,924 | 10/1990 | Bors et al. . |
| 4,988,762 | 1/1991 | Overbeek et al. . |
| 5,017,676 | 5/1991 | Cuscurida . |
| 5,124,384 | 6/1992 | Goldstein . |

FOREIGN PATENT DOCUMENTS

| | | |
|---|---|---|
| 442653 | 8/1991 | European Pat. Off. . |
| 483583 | 5/1992 | European Pat. Off. . |
| 1185216 | 3/1970 | Germany . |
| 4189874 | 7/1992 | Japan . |

OTHER PUBLICATIONS

U.S. patent application Ser. No. 091,489 (Rohm and Haas Company), filed Jul. 14, 1993.
U.S. patent application Ser. No. 111,801 (Rohm and Haas Company), filed Aug. 25, 1993.
U.S. patent application Ser. No. 632,302 (Rohm and Haas Company), filed Dec. 21, 1990.
U.S. patent application Ser. No. 059,421 (Rohm and Haas Company), filed May 4, 1993.
"Feasibility of Using Alkoxy Silane Functional Monomers for the Development of Crosslinking Emulsions", T. R. Bourne, B. G. Bufkin, G. C. Wildman and J. R. Grave, Journal of Coatings Technology, vol. 54, No. 684, Jan. 1982.
"Comparison of Methods for the Preparation of Acetoacetylated Coating Resins", J. S. Witzeman; W. Dell Nottingham, F. J. Del Rector, Journal of Coatings Technology, vol. 62, 1990, 101.

*Primary Examiner*—Bernard Lipman
*Attorney, Agent, or Firm*—David T. Banchik

[57] ABSTRACT

The present invention relates to the preparation of emulsion polymers bearing reactive functional groups which are post-reacted with an amino silane to promote crosslinking during film formation.

Polymers of the present invention are particularly useful in polish and coating compositions where detergent resistance and removability are required.

5 Claims, No Drawings

SILANE-MODIFIED FLOOR FINISH VEHICLES

FIELD OF THE INVENTION

The present invention relates to the preparation of emulsion polymers bearing reactive functional groups which are post-reacted with an amino silane to promote crosslinking during film formation.

Polymers of the present invention are particularly useful in polish and coating compositions where detergent resistance and removability are required.

BACKGROUND OF THE INVENTION

In polish and coatings applications where durability and toughness are important, polymers employing metal ions as crosslinking agents have traditionally been used. These metal containing polymers allowed the formulator to produce polish and coatings compositions with all necessary formulation ingredients in a single-package system. The single-package system allows the formulator to use the coating at the site without additional mixing and preparation, and at a lower cost, when compared to multi-package compositions. More recently, however, metal containing coatings have come under extreme pressure from both federal and state governments due to environmental concerns. In an attempt to address these concerns, formulators are demanding from raw material suppliers, polymers which provide equivalent performance without the use of metal ions. In response to the environmental concerns, formulators have increased their use of non-metal containing, single-package emulsion polymer systems.

However, when single-packaged emulsion polymers are cured under ambient conditions, and their performance is compared to metal-containing polymer systems, emulsion polymers suffer inherent shortcomings with respect to durability, toughness and resistance, such as, for example, pad induced scratching from floor machine maintenance procedures. Therefore, aqueous-based, non-metal containing coatings have not found wide acceptance in polish and coating applications where strength, durability and toughness are important. Another shortcoming of aqueous-based no metal containing systems is the need for multiple package systems in order to obtain the equivalent performance of a metal-containing system. Multiple package systems require the end-user to mix components just prior to the coatings application. Often, the use of multiple package systems are impractical and the formulator fails to obtain a proper mix of the components, resulting in coatings that are deficient in properties such as removability of the coating for cleaning purposes.

It is generally known that incorporation of silane functionality into a polymer can yield compositions which self-crosslink at ambient temperature or about 25° Centigrade. Crosslinking occurs due to the facile hydrolysis of alkoxysilane groups to silanols and their subsequent condensation to form Si—O—Si linkages in the presence of water (See e.g., *Feasibility of Using Alkoxy Silane Functional Monomers for the Development of Crosslinking Emulsions,* T. R. Bourne, B. G. Bufkin, G. C. Wildman and I. R. Grave in the Journal of Coatings Technology, Vol. 54, No. 684, Jan. 1982). However, because of the ease of hydrolysis and subsequent condensation of the silane functionality, there has been a continuing and most difficult problem in producing stable silicone-modified waterborne polymers in a single-package system.

What we have found to be novel and unanticipated is a waterborne or water dispersed polymer system which solves the environmental concerns of traditional metal-containing systems. The waterborne system of the present invention cures at ambient temperature, is formulated as a single-package system, is environmentally friendly since it is void of metal ions, and in spite of being aqueous based, is durable, tough and detergent-resistant with removability characteristics that are equivalent to metal ion-based polymer systems.

Furthermore what we have found to also be novel and unanticipated is that the performance of metal containing polymers can be improved by modifying the polymer with silane functionality.

This is accomplished by post-reacting an acetoacetoxy-functional polymer with an amine-functional silane. Coatings produced from the emulsion polymers of the present invention are especially useful for applications to flooring and wall substrates.

PRIOR RELATED ART

What we have found is that many of the problems associated with developing a single-package, self-crosslinking waterborne polymer system are avoided by post-reacting an acetoacetoxy-functional polymer with an amine functional silane. Therefore, while it is generally known to modify the properties of polymers by incorporating functional groups, none of the related art discloses the preparation of polymers containing functional acetoacetate groups with post-polymerization reaction of the acetoacetate group with an amine-functional silane, while removability of the dried coating after curing is maintained.

European Patent Application EP 0 442 653 A2 discloses a process for the production of a polymer having desired functional group(s). The functional group(s) can be adhesion promoters, silicones, olefinically unsaturated groups, and the like. The desired groups(s) are incorporated into the composition by producing a precursor polymer having —NH— and/or —NH$_2$-bound functionality which is further reacted with a molecule which contains at least one enolic carbonyl capable of forming an enamine with the —NH— or —NH$_2$— functionality, and at least one of the desirable groups.

European Patent Application EP 0 483 583 A2 discloses a use for an aminosilane as a hardener or an acetoacetate and/or acetoacetamide functional polymer. Cure of this composition results from the hydrolysis and subsequent condensation of the alkoxy silane groups from the presence of water liberated during enamine formation from atmospheric moisture. This is a two package system in that the silane and acetoacetate functional polymer must be mixed or blended just prior to use.

Ser. No. 091,489 (Rohm and Haas Company) discloses the functionalization of a polymer with various desirable groups such as adhesion promoters, steric stabilizers, and the like, by reacting an enolic carbonyl-containing precursor polymer with a polymer which contains at least one of the desired functional groups and at least one amine capable of forming an enamine with the enolic carbonyl.

Ser. No. 111,801 (Rohm and Haas Company) discloses a process for the preparation the preparation of polymers containing functional acetoacetate groups and then following the polymerization post-reaction of the acetoacetate group with an amine-functional silane to produce self-crosslinking, ambient curing, film-forming polymers.

SUMMARY OF THE INVENTION

The present invention provides a process for producing emulsion polymers containing functional acetoacetate groups, post-reacting with an amino-functional silane to produce self-crosslinking, ambient curing polymers. Coatings produced from polymers of the present invention exhibit improved properties such as scuff and black heel mark resistance, mar resistance, resistance to scratching from machine floor maintenance operations, such as buffing and burnishing, while maintaining a balance between detergent resistance and removability of the emulsion polymer for cleaning purposes.

DETAILED DESCRIPTION

The present invention provides for self-crosslinking, ambient curing, aqueous-based, film-forming polymers containing functional acetoacetate groups which are post-reacted with an amino-functional silane.

Polish and coatings compositions produced from polymers of the present invention exhibit improved properties such as detergent resistance, black heel and scuff mark resistance, mar resistance, resistance to pad induced scratching from machine maintenance operations and tensile properties, such as impact resistance, and tensile strength. Additionally, aqueous-based polish and coatings compositions produced from polymers of the present invention exhibit removability characteristics that are equivalent to metal ion polymer systems.

Polymers

The preferred polymers for use in this invention are vinyl polymers with pendant acetoacetate groups, alternately known as beta-ketoesters. The term "pendant" is used in the specification to mean "attached to the polymer backbone and available for further reaction." Pendant should not be read in the strict sense which would exclude the attachment of such groups at the termini of a polymer chain. Thus, polymer having acetoacetate functionality introduced on the chain end by an acetoacetate-functional mercaptan, as taught in U.S. Pat. No. 4,960,924, would be useful in this invention. Generally, the pendant acetoacetate groups are attached to the polymer backbone via an organic divalent radical $R^1$ which in turn is attached to the acetoacetate moiety or by a trivalent organic radical $R^2$ bearing two acetoacetate groups.

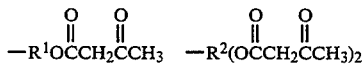

The acetoacetate functional polymers can be prepared by means known in the art. A preferred method is polymerization through incorporation, which includes an acetoacetate functional monomer. A preferred monomer is acetoacetoxyethyl methacrylate which is conveniently referred to throughout this specification as AAEM, shown below.

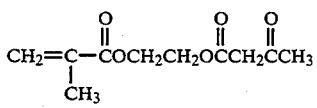

Examples of other monomers useful for introduction of acetoacetate functionality are acetoacetoxyethyl acrylate, acetoacetoxypropyl methacrylate, allyl acetoacetate, acetoacetoxybutyl methacrylate, 2,3-di(acetoacetoxy)propyl methacrylate, and the like. In general, any polymerizable hydroxy-functional monomer can be converted to the corresponding acetoacetate by reaction with diketene or other suitable acetoacetylating agent (See e.g. *Comparison of Methods for the Preparation of Acetoacetylated Coating Resins*, Witzeman, J. S.; Dell Nottingham, W.; Del Rector, F. J. Coatings Technology; Vol. 62, 1990, 101. (and references contained therein).

The vinyl polymers of this invention are most often copolymers of the acetoacetate-functional monomer and other monomers. Examples of useful comonomers are simple olefins such as ethylene, alkyl acrylates and methacrylates where the alkyl group has 1 to 20 carbon atoms (more preferably 1 to 8 carbon atoms), vinyl acetate, acrylic acid, methacrylic acid, acrylonitrile, styrene, isobornyl methacrylate, acrylamide, hydroxyethyl acrylate and methacrylate, hydroxypropyl methacrylate and acrylate, N-vinyl pyrolidinone, butadiene, isoprene, vinyl halides such as vinyl chloride and vinylidene chloride, alkyl maleates, alkyl fumarates, fumaric acid, maleic acid, itaconic acid, and the like.

It is of special importance that the acid groups be of sufficient quantity (usually greater than 5 percent acid functionality on polymer solids, preferably from 8 to 25 percent by weight of the polymer) to provide the polish and coatings compositions produced from polymers of the present invention a mode for dried film removability. The mode of operation for removability is believed to be swelling of the polymer film through the formation of amine salts with the polymeric acid in the polymer matrix of the film, and subsequent hydration or solvation of the salts by water. It is preferable to keep the acid functionality between 8–25 percent to maintain polish film detergent resistance and water resistance. If sufficient acid functionality is added to the polish polymer, the resistance of the polish film to scrubbing with alkaline detergent solutions and resistance to aqueous solutions are greatly compromised.

It is also possible, and sometimes desirable, to include low levels of divinyl or polyvinyl monomers such as glycol polyacrylates, allyl methacrylate, divinyl benzene, and the like, to introduce a controlled amount of gel in the latex particle. It is important, however, to be sure that when this is done, the quality of the film formation is not seriously impaired. Additionally, one may wish to include chain transfer agents to control molecular weight of the polymer.

The acetoacetate-functional polymer may contain from about 0.5 percent to 95 percent of the acetoacetate-functional monomer by weight. In any application, the amount of acetoacetate-functional monomer required will vary from case to case depending upon the desired degree of post-functionalization necessary for the particular end-use application. Generally, however, the acetoacetate monomer concentration will be between 1 percent and 75 percent. Conventional floor polish and coatings compositions will usually contain from about 0.5 percent to 50 percent acetoacetate monomer by weight. Polymers having a molecular weight of from 1,000 to over one million can be used. The lower molecular weight polymers should contain a sufficiently high level of acetoacetate to maximize the degree of post-functionalization. For example, a copolymer of AAEM having a molecular weight under 10,000 would typically contain 30 percent or more of AAEM.

Generally, the vinyl polymer is prepared as a dispersion or emulsion polymer in water by a suitable free radical initiated polymerization technique, using a free radical initiator and appropriate heating. Since a film-forming polymer is sometimes desired, useful emulsion polymers will generally have glass transition temperatures under 70 degrees Centigrade, since these polymers with coalescent will form good quality films at ambient temperatures. If soluble polymers are used in the film-formation process, polymers of higher glass transition temperature are readily used since they are film-forming.

In certain aspects of the invention, polymerization in an aqueous medium and, in particular, aqueous emulsion polymerization, is used to prepare the polymer. Conventional dispersants can be used (e.g. anionic and/or non-ionic emulsifiers such as alkali or ammonium alkyl sulfates, alkyl sulfonic acids, and fatty acids, oxyethylated alkyl phenyls, and the like). The amount of dispersant used is usually 0.1 percent to 6 percent by weight based on the weight of total monomer. Either thermal or redox initiation processes may be used. Conventional free radical initiators may be used (hydrogen peroxide, organic hydroperoxides such as t-butyl hydroperoxide, cumene hydroperoxide, t-amyl hydroperoxide, ammonium and/or alkali persulfates, organic peroxides such as t-butyl perpivalate, t-butyl perbenzoate, benzoyl peroxide, di(n-propyl) peroxydicarbonate, acetyl cyclohexylsulfonyl peroxide, and the like); typically 0.05 percent to 3.0 percent by weight based on the weight of total monomer. Redox systems using the same initiators coupled with a suitable reductant (for example: reducing sugars such as isoascorbic acid, sodium bisulfite, sodium thiosulfate, hydroxyl amine, hydrazine, sodium hydrosulfite) can be used at similar levels, oftentimes in conjunction with a metal catalyst such as salts of transition metals, examples of which are iron sulfate, copper sulfate, vanadium sulfate, and the like. Additionally, non-oxidizing thermal initiators such as 2,2'-Azo-bis-isobutyronitrile, 4,4'-Azo-bis(4-cyanopentanoic acid), 2,2'-Azo-bis(2-amidinopropane) dihydrochloride, and the like. Frequently, a low level of chain transfer agent such as a mercaptan (for example: n-octyl mercaptan, n-dodecyl mercaptan, butyl or methyl mercaptopropionate, mercaptopropionic acid at 0.05 percent to 6 percent by weight based on total weight of monomer) is employed to control molecular weight.

The invention may also be practiced using a solvent-soluble or water-soluble polymer. When this is desired, the polymer may be prepared directly in water if the monomer mix is water-soluble or, as is most often the case, the polymerization solvent is a water miscible solvent such as isopropanol, butyl cellosolve, propylene glycol, and the like. In this case, water may be included in the polymerization mixture or post added after the polymerization is complete. In some cases, the polymer is prepared in a conventional organic solvent such as xylene, butyl acetate, methyl ethyl ketone, methyl tertiary butyl ether, and the like. When organic solvent is employed with or without water, it is convenient to use organic soluble-free radical initiators such as azo-bis-isobutyronitrile, t-butyl-peroctoate, or benzoyl peroxide and whatever heat is convenient to assure smooth copolymerization. Another route to preparation of a water-soluble polymer for this invention is to prepare a vinyl dispersion polymer having enough acrylic or methacrylic acid or other polymerizable acid monomer (usually greater than 10 percent) so that the emulsion polymer can be solubilized by addition of ammonia or other base. Water-soluble polymers of this type are advantageously used as blends with conventional dispersion polymers, preferably those which also have pendant acetoacetate functionality. The blend of alkali-soluble resin and latex polymer has a particularly advantageous property combination of gloss and rheology and is useful in coatings and printing ink applications.

In another embodiment of this invention, an aqueous dispersion contains copolymer particles made up of at least two mutually incompatible copolymers. These mutually incompatible copolymers may be present in the following morphological configurations, for example, core/shell, core/shell particles with shell phases incompletely encapsulating the core, core/shell particles with a multiplicity of cores, interpenetrating network particles, and the like. In all of these cases, the majority of the surface area of the particle will be occupied by at least one outer phase and the interior of the particle will be occupied by at least one inner phase. The mutual incompatibility of the two polymer compositions may be determined in various ways known in the art. The use of scanning electron microscopy using staining techniques to emphasize the difference between the appearance of the phases, for example, is such a technique.

The emulsion polymerization techniques used to prepare such dispersions is taught in Canadian Patent 298,694, granted to Joseph M. Owens, et al. It is advantageous to employ such an arrangement of polymer molecules in the latex particle as taught by Canadian Patent 298,694, to concentrate the pendant acetoacetate in the shell.

As indicated above, a major use for this technology is for functionalizing vinyl polymers dispersed or dissolved in aqueous solvents. Unfortunately, vinyl polymers containing pendant acetoacetate are prone to hydrolysis in water, particularly on heat aging. The hydrolysis occurs at nearly any pH and yields acetoacetic acid,

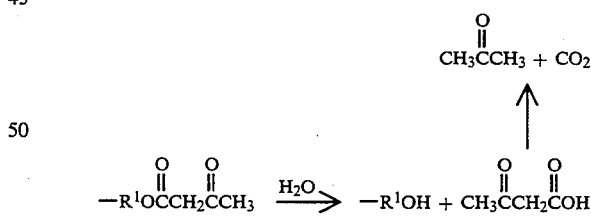

which in turn decomposes to acetone and carbon dioxide.

In an earlier application, U.S. Ser. No. 632,302, the solution to this problem was provided by treating the aqueous acetoacetate polymer after preparation with one molar equivalent of ammonia or a primary amine such as ethanolamine, methyl amine, or isopropyl amine. As described in that application, typically, the polymer is neutralized to a basic pH with one of the aforementioned amines, preferably to a pH greater than 9. Under these conditions, the enamine is formed. The reaction to form the enamine is generally rapid with the rate of formation increasing with temperature. In general, enamine formation is complete within 8 hours. An alternative approach is to raise the pH to about 9, allow the system to equilibrate, and readjust the pH to about 9 to replace the amine consumed by enamine formation. The enamine is stable to hydrolysis at pH's typically greater than 7.

Another approach to preparation of vinyl polymers containing equivalent pendant enamine functionally is to use preformed enamine monomers derived from the appropriate amine and the acetoacetate monomer. In this case, the pH must be kept on the alkaline side during polymerization to avoid hydrolysis of the enamine back to the acetoacetate.

Amino Functional Silanes

Aminosilane-modified polymers of this invention are prepared by adding an effective amount of an aminosilane to a polymer having acetoacetate functionality introduced on the polymer chain by an acetoacetate-functional monomer such as, for example, acetoacetoxy ethyl methacrylate. The quantity of aminosilane that is added to the polymer is a function of the acetoacetate functionality content of the polymer. As mentioned above, the level of acetoacetoxy functional monomer is generally from about 1 weight percent to about 75 weight percent, based on the weight of the polymer. The level of aminosilane to modify the polymer is from about 0.10 to about 1.0 moles of amine moiety to one mole of acetoacetoxy group. The aminosilane modification of the AAEM functionalized emulsions of this invention develop sufficient crosslinking during film formation to achieve sufficient cohesion to withstand the polymer film swelling tendencies of the alkaline-detergent cleaning process and mechanical stresses of the machine buffing and burnishing process.

If insufficient aminosilane is used in relation to the acetoacetate-functional vinyl polymer, properties such as, for example, detergent resistance, black heel and scuff mark resistance, mar resistance, and responsiveness to floor machine maintenance procedures of the dried coating may be compromised. More specifically, detergent resistance of the polish film is compromised because sufficient polish film swelling occurs to overcome the cohesive strength of the polish film. The mechanical process of detergent scrubbing a floor polish is then sufficient to damage the integrity of the polish film. Also, it is believed that limited crosslinking occurring during film formation from insufficient aminosilane used in relation to the acetoacetate-functional vinyl polymer reduces the cohesive properties of the polish film, resulting in pad scratching from floor machine burnishing operations. Whereas, on the other hand, if the ratio of the moles of aminosilane to the moles of acetoacetate functionality is much greater than 1 of the vinyl polymer, coating properties such as film formation may become impaired due to excessive precrosslinking of the silicone groups.

Aminosilanes of various molecular weights and structures may be used to modify the acetoacetate function polymer in practicing the invention. The general structure of the aminosilanes useful for the invention is

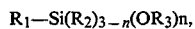

$R_1-Si(R_2)_{3-n}(OR_3)_n$, where n is the greater or equal to 1 but less than or equal to 3, $R_1$ is an alkyl or phenyl group or combinations thereof and contains at least one amine group capable of forming an enamine with the acetoacetoxy group, $R_3$ is alkyl, phenyl or hydrogen atom or combinations thereof, and $R_2$ is a hydrogen atom phenyl or alkyl group or combinations thereof. The group $R_2$ may also be oligomers of silane, which may or may not contain $OR_3$ groups and may or may not include amine functionality capable of undergoing enamine formation with acetoacetoxy groups. Preferably, however, the aminosilanes have an average molecular weight, as may be determined by gel permeation chromatography, of from about 140 to about 500, most preferably from about 150 to about 250. Practical considerations such as solubility, hydrolysis rate, compatibility with the acetoacetate precursor polymer, polymer stability, and the like, are the only limitations placed upon the structure and molecular weight of the aminosilane. Although for convenience purposes, it is most preferred that the molecular weight not exceed a maximum of about 190 to about 250, that n is equal to 1 or 2, that $R_2$ is a methyloxy or ethyloxy group and that $R_1$ is an alkyl group of 3 to 6 carbon atoms and contains no more than one amine group capable of forming an enamine with the acetoacetoxy group.

Amino silanes found to be effective modifiers of acetoacetate-functional vinyl polymer polymers may be selected from the group consisting of trimethoxysilylpropyldiethylenetriamine, N-methylaminopropyltrimethoxysilane aminoethylaminopropylmethyldimethoxysilane, aminoethylaminopropyltrimethoxysilane (Dow Corning Z-6020), aminopropylmethyldimethoxysilane, aminopropyltrimethoxysilane, polymeric aminoalkylsilicone, aminoethylaminoethylaminopropyl-trimethoxysilane, N-methylaminopropyltrimethoxysilane, methylamino-propyltrimethoxysilane, aminopropylmethyldimethoxysilane, aminopropyltriethoxysilane, 4-aminobutyltriethoxysilane, oligomeric aminoalkylsilane and the like, which are available from Dow Corning, Midland, Mich., Union Carbide Specialty Chemicals Division, Danbury, Conn. and Huls of America, Piscataway, N.J., Wacker Silicones Corporation of Adrian, Mich.

In the practice of the invention, aminosilane-modified coatings are prepared by adding a specific quantity of aminosilane to acetoacetate-functional vinyl polymer. The quantity of silane added should be in specific proportion, for reasons stated earlier, to the acetoacetate content of the polymer. The amino-functional silane is preferably added after the polymerization of the acetoacetate-functional vinyl emulsion polymer.

In another aspect of the invention, the acid functionality in the precursor polymer can be further reacted with divalent metal ions, such as, zinc, calcium, zirconium, and the like, as taught in U.S. Pat. No. Nos. 3,328,325 and 3,467,610, which are by this reference, incorporated herein. The metal ion is preferably introduced as a metal oxide, tetra-amino metal bicarbonate complex or as other forms of metal salts. The level of divalent metal ion to acid functionality can be from about 0.005 moles per two moles of acid, to about one per two moles of acid functionality, preferably from about 0.20 moles per two moles of acid, to about 0.50 moles per two moles of acid.

In general, the aminosilane can be added directly to the acetoacetate-functional precursor polymer. However, for optimum performance and processing of the final silicone-modified polymer, an auxiliary surfactant may be required. This is particularly true, for example, in some cases where the precursor polymer is produced by emulsion polymerization. In this case, the surfactant can provide, for example, enhanced stability, as well as enhanced desirable properties such as mar resistance when used in conjunction with aminosilane.

The auxiliary surfactant can be added preferably before or after the addition of the aminosilane, or as part of the preparation of the precursor, as in the case of, for example, emulsion polymerization.

Surfactants may be characterized by their "Hydrophilic-Lipophilic Balance" (HLB) value. Surfactants with HLB values of less than 10 are considered to possess more lipophilic character, while surfactants with HLB values greater than 10 are considered to possess more hydrophilic character. In the context of the preferred surfactants, non-ionic surfactants with HLB values with more hydrophilic character, HLB>(greater than) 10 are desirable. More preferably, the HLB value should be greater than 15.

Surfactant levels of up to 10 percent of the weight of the precursor can be used. The more preferable level of surfactant is between 3 percent and 6 percent of the weight of the precursor. The only limitations on the surfactant level are, for example, poor water resistance, instability, and the like.

Examples of surfactants which may be used in the practice of the present invention are selected from the group consisting of non-ionics, such as octylphenoxypolyethoxyethanols, nonylphenoxypolyethoxyethanols, polypropyloxyethoxy alcohols, and the like, and ionics, such as sodium lauryl sulfate, sodium stearate, and the like.

Additives

The acetoacetate-functional vinyl polymer modified with aminosilanes of this invention may be formulated for the chosen end use. Additives such as thickeners, dispersants, pigment, extenders, fillers, anti-freeze agents, plasticizers, adhesion promoters, coalescents, wetting agents, defoamers, colorants, non-aidehyde-based biocides, soaps and slip agents may be incorporated.

TEST METHODS

EVALUATING THE PERFORMANCE OF CLEAR COATINGS BASED ON SILICONE-MODIFIED LATTICES

Mar Resistance

This test is based on striking the coating at a shallow angle with a hard object; in the examples provided, the object was the fingernail of the individual performing the test. This test gives an indication of how the coating will resist marring, which leads to gloss reduction of the coating.

After the coating is applied to the substrate and allowed to cure, the coated substrate is placed on a solid surface such as a table top and struck with the operator's fingernail. The operator's fingernail is kept parallel to the coated surface and the impact angle is greater than 45° from the normal of the surface, to increase the likelihood of marking the coating.

When comparing coatings, it is important that the same operator perform the test. This test is designed to distinguish relative differences.

We used the following rating system:

| Rating | Appearance |
| --- | --- |
| 1-Excellent | No perceptible marks |
| 3-Good | Marks which appear as thin scratches |

-continued

| Rating | Appearance |
| --- | --- |
| 5-Poor | Marks which are wide scratches |

Black Heel Mark and Scuff Resistance

The method for determining black heel and scuff resistance is described in Chemical Specialty Manufacturers Association Bulletin No. 9-73, except commercially available rubber shoe heels were used in place of the recommended 2" rubber cubes.

We determined the percentage of the coated substrate area which was covered by black heel and scuff marks; this is conveniently performed with transparent graph paper. Black heel marks are an actual deposition of rubber onto or into the coating.

A scuff mark, on the other hand, results from a physical displacement of the coating and appears as an area of reduced gloss. Scuff and black heel marks can occur simultaneously at the point where the heel impacts the substrate; i.e., upon removal of a black heel mark, a scuff may be present.

Gloss and Recoat Gloss

The method for determining the gloss performance and recoat gloss performance of polish formulations is described in Annual Book of ASTM Standards, Section 15, Volume 15.04, test procedure ASTM D 1455.

Detergent Resistance

The method for determining detergent resistance is described in Annual Book of ASTM Standards, Section 15, Volume 15.04, test procedure ASTM D 3207, except 1/20 dilution of Forward DC (S.C. Johnson & Son, Inc., Racine, Wis. 53403 USA) in water was used as test detergent solution and a 1000 gram weight was added to the brush assembly.

Removability

The method for determining polish removability is described in Annual Book of ASTM Standards, Section 15, Volume 15.04, test procedure ASTM D 1792, except a 1000 gram weight was added to the brush assembly.

Floor Wear Tests for Durability and Machine Maintenance Responsiveness

The floor wear test areas were stripped of residual polish and repolished in the typical janitorial procedure as follows:

The floors were dust mopped to remove loose dirt, a 1:1 aqueous solution of commercial stripper solution "SSS Easy Strip" Standardized Sanitation Systems, Inc., Burlington, Mass. 01803) was applied by string mop at a rate of ca. 1,000 square feet/gallon; after a five minute soak period, the floors were scrubbed with a sixteen inch black stripping floor pad (3M Company, St. Paul, Minn. 55101; "Scotch Brite" Slim Line Floor Pad) on a 175 rpm floor machine (Howell Electric Motors, Plainfield, N.J., model 88400-026); the stripped floors were thoroughly rinsed twice by damp mopping with clear water, and allowed to dry. The stripped floors were divided into 20 square foot sections perpendicular to the normal direction of floor traffic flow. To each of the sections four coats of polish to be tested were applied, with a mohair applicator (4"×6"), at a rate of ca.

2,000 square feet/gallon. Each coat was allowed to dry for one hour before the next coat was applied.

Coatings were applied to floors composed of vinyl composition tiles, and cured at ambient conditions for a specific time prior to opening the floors to pedestrian traffic. The floor test areas were exposed to foot traffic as well as wheeled traffic from maintenance carts, sample trays etc. The visual gloss as well as scuffing and scratching before and after a sufficient exposure time were measured. After four weeks of exposure to traffic, machine burnishing maintenance was performed on the test floors in the typical janitorial fashion as follows:

The floors were dust mopped to remove loose dirt; the floors were burnished with an eighteen inch UHS Tan Buffer Pad (3M Company, St. Paul, Minn. 55101 "Scotch Brite" Ultra High Speed Tan Buffer Pad) on a 2000 rpm electric floor burnishing machine (Hako Minuteman, 111 S. Route 53, Addison, Ill. 60101, model M23000-02, 2 speed). The test floors were exposed to five passes of the burnishing machine, one time per week, for a four week period. The visual gloss after burnishing or burnish response as well as the pad scratch resistance of the test finishes were measured on a weekly basis.

When comparing coatings for pad induced scratching from machine burnishing operations, it is important that the same operator perform the test and evaluate the response of the coating. This test is designed to distinguish relative differences.

We used the following rating system:

| Rating | Appearance |
| --- | --- |
| 1-Nil | No perceptible marks |
| 3-Slight | Marks which appear as thin circular scratches |
| 5-Moderate | Marks which are wide circular scratches |

Floor Wear Tests for Detergent Resistance and Removability Testing

Detergent resistance testing was performed after four weeks of exposure to pedestrian traffic. For detergent testing, the floors were dust mopped to remove loose dirt, a 1/20 dilution of Forward DC (S.C. Johnson & Son, Inc., Racine, Wisconsin) in water was applied by string mop at a rate of ca. 1,000 square feet/gallon; after a one minute soak period, the floors were scrubbed with a sixteen inch blue scrubbing floor pad (3M Company, St. Paul, Minn. 55101; "Scotch Brite" Slim Line Floor Pad) on a 175 rpm floor machine (Howell Electric Motors, Plainfield, N.J., model 88400-026). The scrubbing operation involved three passes with the machine over the test floors. The scrubbed floors were thoroughly rinsed twice by damp mopping with clear water, and allowed to dry. The polish coatings were evaluated for film damage/removal and haze.

The removability of the polish coating from the floor tests was performed in the identical manner outlined for preparing the floor for testing, after eight weeks of exposure to pedestrian traffic and machine burnishing operations. The polish coatings were evaluated for film removal and ease of removal.

GLOSSARY

Unless otherwise indicated in these examples, the following terms, symbols and/or abbreviations should be understood to have the meanings shown below. The following abbreviations and terms are used as indicators of position on scales of ratings used in reporting the detergent resistance, removability, black heel mark resistance, scuff mark resistance and pad swirling resistance from machine maintenance tests reported in the Examples, where "Very Poor" is the lowest rating and "Excellent" the highest rating. For example, a 10-point scale includes Very Poor, Poor, Poor-Fair, Fair, Fair-Good, Good, Good-Very Good, Very Good, Very Good-Excellent, Excellent.

VP=Very Poor
P=Poor
P-F=Poor to Fair
F=Fair
F-G=Fair to Good
G=Good
G-VG=Good to Very Good
VG=Very Good
VG-Exc=Very Good to Excellent
Exc=Excellent The following examples are provided to illustrate some embodiments of the invention. They should not be read as limiting the scope of the invention which is more fully described in the specification and claims.

Unless otherwise indicated, percentages are by weight based on the total solids.

In order to properly evaluate the performance of an emulsion polymer intended for use in a polish vehicle, it is necessary that the polymer be formulated as a polish. The formulation of the emulsion polymers of this invention is done in the manner common and well understood to those versed in this art. The ingredients used, and their proportions and manner of addition are the same as is commonly practiced with conventional technology emulsion polymers.

| Aqueous Floor Polish Formulation for Latex Compositions of Examples I, II, III, IV, and V of this Invention (Order of addition shown) | | | |
| --- | --- | --- | --- |
| Material | Function | Supplier | Amount (parts by weight) |
| Water | diluent | | 14.1 |
| FC-120 (1%) | wetting agent | 3M Company | 1.0 |
| Kathon CG/ICP (1.5%) | biocide | Rohm and Haas Co. | 0.03 |
| SWS-211 | defoamer | Wacker Silicones Corp. | 0.02 |
| Diethylene Glycol Ethyl Ether | coalescent | Dow Chemical | 9.0 |
| Tributoxy Ethyl Phosphate | leveling aid | FMC Corp. | 1.3 |
| Polymer (30%) | vehicle | | 68.3 |
| SMA-2625 (15%) | alkali soluble/ swellable resin | ARCO | 8.3 |
| AC-392N (35%) | polyethylene | Eastman Chemical | 9.3 |

-continued

Aqueous Floor Polish Formulation for Latex
Compositions of Examples I, II, III, IV, and V of this Invention
(Order of addition shown)

| Material | Function | Supplier | Amount (parts by weight) |
|---|---|---|---|
| | wax emulsion | | |
| Formulation Constants: | | | |
| Polymer/ASR/Wax Ratio | | | 82/5/13 |
| Theoretical Non-Volatile Solids | | | 25% |

Example I

Example I shows the enhancement of coating performance aminosilane modification brings to the AAEM containing latex. We also show the effect of aminosilane level on coating performance.

Preparation of Precursor Latex

A polymer dispersion (precursor latex IA) was prepared according to the technology taught in Canadian Patent 298,694, granted to Joseph M. Owens, et al. from a monomer emulsion containing the following ratio of monomers:

1st Stage 51% of 40 BA/21 MMA/20 AAEM/10 HEMA/9% MAA

2nd Stage 49% of 10 MMA/80 STY/10 AA

The details for the preparation of the precursor lattices I-A and I-B are described below. Both Precursors are identical in their preparation except the monomer acetoacetoxy ethyl methacrylate (AAEM) was omitted from I-B.

A two-stage polymer (Precursor Latex IA) was prepared from two monomer mixtures: the first stage (consisting of 51% of the total monomers) contained 162.0 grams of water, 2.9 grams of sodium lauryl sulfate (28% aqueous solution in water), 159.0 grams of butyl acrylate, 100.0 grams of methyl methacrylate, 80.0 grams of acetoacetoxyethyl methacrylate, 40.0 grams of 2-hydroxyethyl methacrylate, and 36.0 grams of methacrylic acid. A 22.5 gram sample was removed from this monomer emulsion mixture and added to a kettle which contained a mixture of 388.0 grams of water and 22.7 grams of sodium lauryl sulfate (28% aqueous solution in water) under dry nitrogen and heated to 85 C. An initiator charge of 3.7 grams of ammonium persulfate dissolved in 12.0 grams of water was added. Starting ten minutes later, the remaining monomer was gradually added over a one hour period. After the one hour period, a second monomer mixture (consisting of 49% of the total monomers) that contained 162.0 grams of water, 2.9 grams of sodium lauryl sulfate (28% aqueous solution in water), 40.0 grams of methyl methacrylate, 318.0 grams of styrene, and 40.0 grams of acrylic acid, was gradually added over a one hour period, along with 1.0 gram of ammonium persulfate dissolved in 56 grams of water in a separate feed. After these additions were completed, the emulsion was cooled to 59 C. and chased by adding 0.55 grams of t-butyl hydroperoxide dissolved in 7.0 grams of water followed by 0.24 grams of isoascorbic acid dissolved in 20 grams of water. The chase procedure was repeated 20 minutes later. The latex was then cooled to ambient temperature before modification with the aminosilane.

Precursors I-A and I-B are identical in their preparation, two-stage process, and composition except AAEM was omitted from I-B.

Preparation of Silicon-Modified Latex

Into a mixing vessel, precursor I-A, whose preparation is described above, was charged. With stirring, the mixture was diluted to 35% total solids and TRITON X405 (70%) was added to the stirring precursor (3.3% on polymer solids) over the course of about 5 minutes. Approximately 10 minutes after the X405 addition, the pH was adjusted to 7 with aqueous ammonia and the aminosilane was added dropwise over the course of about 5 minutes. The final product of the reaction had 30% solids (adjusted with water, if necessary). The mixture was allowed to stir for about one hour after the addition of the aminosilane was complete. Following the addition of the aminosilane, the pH of the mixture was adjusted to 8.5 with aqueous ammonia. The amounts of materials used are shown in Table I-1. The silane-modified latex was allowed to stand for about 16 hours before it was formulated into a polish.

Testing of Aqueous Floor Polishes Based on Compositions I-1 to I-10

To vinyl composition panels, 2 coats of polish based on compositions I-1 to I-10 were applied with about one hour between coats. After the final coat, the coated panels were allowed to cure at 25 degree Centigrade for 24 hours before testing. The test results are displayed in Table I-2.

TABLE I-1

| Composition | I-1 | I-2 | I-3 | I-4 | I-5 | I-6 | I-7 | I-8 | I-9 | I-10 (1) |
|---|---|---|---|---|---|---|---|---|---|---|
| Material (In order of addition) | | | | | | | | | | |
| Precursor I | 100 | 100 | 100 | 100 | 100 | 0.00 | 0.00 | 0.00 | 0.00 | 0.00 |
| Precursor I | 0.00 | 0.00 | 0.00 | 0.00 | 0.00 | 100 | 100 | 100 | 100 | 100 |
| A0700 (2) | 0.0 | 0.397 | 0.79 | 1.58 | 3.16 | 0.79 | 1.58 | 3.16 | 0.0 | 0.00 |
| Moles Silane/ Moles AAEM | 0.00 | 0.13 | 0.25 | 0.50 | 1.00 | 0.25 | 0.50 | 1.00 | 0.00 | 0.00 |

Footnotes:
(1) Precursor IB was post treated with 3.3% by weight Zinc (calculated as metal on polymer solids), in the form of a tetra-amino Zinc Bicarbonate complex. The resulting metal crosslinked polymer had a pH of 9.3 and had 38% total solids.
(2) Aminoethyl aminopropyl trimethoxysilane ter, 2.9 grams of sodium lauryl sulfate (28% aqueous solution in water), 40.0 grams of methyl methacrylate, 318.0 grams of styrene, and 40.0 grams of acrylic acid, was gradually added over a one hour period, along with A Comparative Polymer (I-10) with no AAEM functionalization and post treatment with aminosilane was also prepared and was post-treated with 3.3% Zinc, as tetra-amino Zinc Bicarbonate complex. The latex compositions I-1 - I-10 were formulated into floor finishes in similar formulations, adjusting the formulation for emulsion solids to maintain equivalent formulations solids, and the polishes were tested for performance properties in accordance with standard test method procedures, with the following results:

TABLE I-2

Properties of Aqueous Floor Polishes Based on Composition I-1 to I-10

| Latex Composition | Mar Resistance | Gloss | Recoat Gloss | % Black Heel Marks | Detergent Resistance | Removability (Film Removal) |
| --- | --- | --- | --- | --- | --- | --- |
| I-1 | 5 | VG | VG-Exc | 7.8 | Poor | Exc (100%) |
| I-2 | 3 | VG | VG-Exc | 7.4 | VG | VG (70%) |
| I-3 | 3 | VG-Exc | VG-Exc | 4.7 | VG-Exc | Good (50%) |
| I-4 | 2 | VG-Exc | VG-Exc | 5.4 | Exc | Good (50%) |
| I-5 | 2 | VG-Exc | VG-Exc | 4.2 | Exc | F-G (30%) |
| I-6 | 5 | VG-Exc | VG-Exc | 7.7 | Poor | Exc (100%) |
| I-7 | 5 | VG-Exc | VG-Exc | 7.5 | Poor | Exc (100%) |
| I-8 | 5 | VG-Exc | VG-Exc | 7.2 | VG | Exc (100%) |
| I-9 | 4 | VG-Exc | VG-Exc | 7.3 | Poor | Exc (100%) |
| I-10 | 2 | Exc | Exc | 5.6 | Exc | Exc (100%) |

The crosslinking occurring during polish film formation with the aminosilane modification of the AAEM functionalized emulsions in the compositions I-3 - I-5 of Example 1 provides the polishes formulated from the compositions I-3- I-5 polymers with improved detergent resistance compared to the non AAEM functionalized polymer based on composition I-9. The polishes formulated from the compositions I-3–I-5 of Example 1 showed much better mar and black heel mark resistance than the non AAEM functionalized polymer based on composition I-9, and similar mar and black heel mark resistance to the zinc metal containing polymer based on composition 1-10.

EXAMPLE II

Example II shows the enhancement of coating performance aminosilane modification brings to the precursor AAEM containing latex. We also show the effect of aminosilane level and aminosilane type on coating performance.

Preparation of Precursor Latex

A polymer dispersion (precursor latex II A) was prepared according to the technology taught in Canadian Patent 298,694, granted to Joseph M. Owens, et. al., from a monomer emulsion containing the following ratio of monomers:

1st Stage 51% of 40 BA/31 MMA/20 AAEM/9% MAA

2nd Stage 49% of 10 MMA/80 STY/10 AA

A two-stage polymer (Precursor Latex IIA) was prepared by heating a kettle which contained a mixture of 388.0 grams of water and 22.7 grams of sodium lauryl sulfate (28% aqueous solution in water) under dry nitrogen to 85 C. An initiator charge of 3.7 grams of ammonium persulfate dissolved in 12.0 grams of water was added. Starting ten minutes later, the first monomer mixture, (consisting of 51% of the total monomers) containing 162.0 grams of water, 2.9 grams of sodium lauryl sulfate (28% aqueous solution in water), 159.0 grams of butyl acrylate, 140.0 grams of methyl methacrylate, 80.0 grams of acetoacetoxyethyl methacrylate, and 36.0 grams of methacrylic acid, was gradually added over a one hour period. After the one hour period, a second monomer mixture (consisting of 49% of the total monomers) that contained 162.0 grams of water, 2.9 grams of sodium lauryl sulfate (28% aqueous solution in water), 40.0 grams of methyl methacrylate, 318.0 grams of styrene, and 40.0 grams of acrylic acid, was gradually added over a one hour period, along with 1.0 gram of ammonium persulfate dissolved in 56 grams of water in a separate feed. After these additions were completed, the emulsion was cooled to 59 C. and chased by adding 0.55 grams of t-butyl hydroperoxide dissolved in 7.0 grams of water followed by 0.24 grams of isoascorbic acid dissolved in 20 grams of water. The chase procedure was repeated 20 minutes later. The latex was then cooled to ambient temperature before modification with the aminosilane.

Preparation of Silicone-Modified Latex

The procedure for the preparation of a silicone-modified latex based on precursor II-A was the same as described in Example I, except the materials and proportions used are shown in Table II-1. The silane-modified latex was allowed to stand for 24 hours before it was formulated into a polish.

Testing of Floor Polishes Based on Compositions II-1 to II-3

To black vinyl composition tiles, 2 coats of polishes based on compositions II-1 to II-3 and I-10 were applied with about one hour between coats. After the final coat, the coated tiles were allowed to cure at 25 degrees Centigrade for 24 hours before testing. The test results are displayed in Table II-2.

TABLE II-1

| Composition (In order of addition) (Quantities in parts by weight) | II-1 | II-2 | II-3 |
| --- | --- | --- | --- |
| Material | | | |
| Precursor IIA | 100 | 100 | 100 |
| A0700 (1) | 0.0 | 1.59 | 0.00 |
| A0800 (2) | 0.0 | 0.0 | 1.28 |
| Mole Silane/ Mole AAEM | 0.00 | 0.50 | 0.50 |

Footnotes:
(1) Aminoethyl aminopropyl trimethoxysilane
(2) Aminopropyltrimethoxysilane A Comparative Polymer (I-10) with no AAEM functionalization and post treatment with aminosilane was also prepared and was post-treated with 3.3% Zinc, as tetra-amino Zinc Bicarbonate complex. The latex compositions II-1 through II-3 were formulated into floor finishes in similar formulations, adjusting the formulation for emulsion solids to maintain equivalent formulations solids, and the polishes were tested for performance properties in accordance with standard test method procedures, with the following results:

TABLE II-2

Properties of Aqueous Floor Polishes Based on Composition II-1 to II-3

| Latex Composition | Detergent Resistance | Removability (Film Removal) | Black Heel Marks (% Coverage) | Scuff Marks (% Coverage) |
|---|---|---|---|---|
| II-1 | Poor | Exc (100%) | 5.9 | 6.8 |
| II-2 | VG–Exc | G–VG (60%) | 2.5 | 4.9 |
| II-3 | VG | G–VG (60%) | 1.5 | 5.0 |
| I-10 | VG–Exc | Exc (100%) | 3.7 | 4.7 |

The crosslinking occurring during polish film formation with the aminosilane modification of the AAEM functionalized emulsions in the compositions II-2 and II-3 of Example II provides the polishes formulated from the compositions II-2 and II-3 with improved detergent resistance compared to the non AAEM functionalized polymer based on composition II-1. The polishes formulated from the compositions II-2 and II-3 of Example II showed much better scuff and black heel mark resistance than the non AAEM functionalized polymer based on composition II-1, and similar scuff and black heel mark resistance to the zinc metal containing polymer based on composition 1-10. The aminosilane modified AAEM functionalized emulsion based polishes showed some degree of removability compared to the zinc containing emulsion based polish.

EXAMPLE III

Example III shows that coating performance is effected by the location of the AAEM in the polymer latex. Canadian Patent 298,694, granted to Joseph M. Owens, et. al. teaches that two stage emulsion polymerizations can be used to control the location of monomer groups within the overall polymer matrix. A preferred embodiment of this invention relies on the preparation of a polymer latex according to Canadian Patent 298,684. Example III will show that incorporating the AAEM functional monomer in the second stage of the polymerization process, forces the AAEM to reside within the emulsion and decreases the concentration of the AAEM functionality at the surface of the emulsion. The low concentration of AAEM functionality at the emulsion surface reduces the enamine formation of the aminosilane with the AAEM and results in low crosslinking during film formation.

Preparation of Precursor Latex

A polymer dispersion (precursor latex III A) was prepared according to the technology taught in Canadian Patent 298,694, granted to Joseph M. Owens, et. al., from a monomer emulsion containing the following ratio of monomers:

1st Stage 43.8% of 60 BA/21 MMA/10 HEMA/9% MAA

2nd Stage 57.2% of 10 AAEM/80 STY/10 AA

A two-stage polymer (Precursor Latex IIIA) was prepared from two monomer mixtures: the first stage (consisting of 43.8% of the total monomers) contained 162.0 grams of water, 3.0 grams of sodium lauryl sulfate (28% aqueous solution in water), 152.0 grams of butyl acrylate, 100.0 grams of methyl methacrylate, 40 grams of 2-hydroxyethyl methacrylate, and 36.0 grams of methacrylic acid. A 22.5 gram sample was removed from this monomer emulsion mixture and added to a kettle which contained a mixture of 388.0 grams of water and 22.7 grams of sodium lauryl sulfate (28% aqueous solution in water) under dry nitrogen and heated to 85 C. An initiator charge of 3.7 grams of ammonium persulfate dissolved in 12.0 grams of water was added. Starting ten minutes later, the remaining monomer was gradually added over a one hour period. After the one hour period, a second monomer mixture (consisting of 57.2% of the total monomers) that contained 162.0 grams of water, 2.9 grams of sodium lauryl sulfate (28% aqueous solution in water), 40.0 grams of methyl methacrylate, 318.0 grams of styrene, and 40.0 grams of acetoacetoxyethyl methacrylate, and 40.0 grams of acrylic acid, was gradually added over a one hour period, along with 1.0 gram of ammonium persulfate dissolved in 56 grams of water in a separate feed. After these additions were completed, the emulsion was cooled to 59 C. and chased by adding 0.55 grams of t-butyl hydroperoxide dissolved in 7.0 grams of water followed by 0.24 grams of isoascorbic acid dissolved in 20 grams of water. The chase procedure was repeated 20 minutes later. The latex was then cooled to ambient temperature before modification with the aminosilane.

Preparation of Silicone-Modified Latex

The procedure for the preparation of a silicone-modified latex based on precursor IA was the same as described above in Example I, except the materials and proportions used are shown in Table III-1. The silane-modified lattices were allowed to stand for 1 day before they were formulated into polishes.

Testing of Polishes Based on Compositions III-1 to III-3

To vinyl composition tiles, 2 coats of polishes based on compositions III-1 to III-3 and composition I-10 were applied with about one hour between coats. After the final coat, the coated panels were allowed to cure at 25 degrees Centigrade for 24 hours before testing. The test results are displayed in Table III-2.

A Comparative Polymer (I-10) with no AAEM functionalization and post treatment with aminosilane was also prepared and was post-treated with 3.3% Zinc, as tetra-amino Zinc Bicarbonate complex. The latex compositions III-1–III-3 and composition I-10 were formulated into floor finishes in similar formulations, adjusting the formulation for emulsion solids to maintain equivalent formulations solids, and the polishes were tested for performance properties in accordance with standard test method procedures, with the following results:

TABLE III-1

| Composition | III-1 | III-2 | III-3 |
|---|---|---|---|
| Material (In order of addition) | | | |
| Precursor IA | 100 | 100 | 100 |
| A0700 (1) | 0.0 | 0.0 | 1.78 |
| A0800 (2) | 0.0 | 1.44 | 0.0 |
| Moles Silane/ | 0.00 | 1.0 | 1.0 |

TABLE III-1-continued

| Composition | III-1 | III-2 | III-3 |
|---|---|---|---|
| Moles AAEM | | | |

Footnotes:
(1) Aminoethyl aminopropyl trimethoxysilane
(2) Aminopropyl trimethoxysilane.

TABLE III-2

Properties of Aqueous Floor Polishes Based on Composition III-1 to III-3

| Latex Composition | Detergent Resistance | Removability (Film Removal) | Black Heel Marks (% Coverage) | Scuff Marks (% Coverage) |
|---|---|---|---|---|
| III-1 | Poor | Exc (100%) | 5.8 | 8.5 |
| III-2 | VG | VG (70%) | 6.0 | 8.2 |
| III-3 | Good | VG (70%) | 6.6 | 7.4 |
| I-10 | VG-Exc | Exc (100%) | 3.5 | 4.7 |

The surface concentration of the AAEM in the polymer latex is not optimal for aminosilane modification to occur. The amount of crosslinking occurring during polish film formation with the aminosilane modification of the AAEM functionalized emulsions in the compositions III-2 and III-3 of Example III is limited, providing the polishes formulated from the compositions III-2 and 111-3 with no improvement in scuff and black heel mark resistance compared to the non-aminosilane modified polymer based on composition III-1. The polishes formulated from the compositions III-2 and III-3 of Example II showed worse detergent resistance and scuff and black heel mark resistance than the zinc metal containing polymer based on composition 1-10.

EXAMPLE IV

Floor Wear Test

Example IV shows that silicone modification improves the performance of floor polish coatings compared to metal free coating.

Preparation of Lattices

Lattices I-1, 1-5, and 1-10 are described above in Example I, were used. Preparation of Latex IV-A (Comparative-metal free floor polish vehicle) is prepared as follows:

An emulsified monomer mixture is prepared by slowly adding the following monomers in sequence to a stirred solution of 77 grams of 28% solution of sodium lauryl sulfate in 2600 grams of deionized water:

| Monomer | weight (grams) | (percent by weight of total monomers) |
|---|---|---|
| butyl acrylate | 1981 | (28.00) |
| methyl methacrylate | 2441 | (34.25) |
| methacrylic acid | 849 | (12.00) |
| allylmethacrylate | 53 | (0.75) |
| styrene | 1769 | (25.00) |

Polymerization Procedure

In a suitable reaction vessel equipped with a thermometer, condenser, and stirrer, a solution of 176 grams of 28% SLS solution and 5150 grams deionized water was heated to 80-85 C. A 164 gram portion of the monomer emulsion described above was added all at once to the reaction vessel and the temperature adjusted to 80-82 C. The kettle charge of the ammonium persulfate (APS) catalyst solution (41.5 grams dissolved in 200 grams of water) was added all at once. Within about five minutes the onset of polymerization is signaled by a temperature rise of 3-5 C. and a change in the appearance (color and opacity) of the reaction mixture. When the exotherm has ceased, the remaining monomer mixture and the cofeed catalyst solution (20.7 grams APS in 600 grams deionized water) are gradually added to the reaction vessel. The rate of addition must be chosen based on the rate at which the heat of the polymerization reaction can be removed by cooling (2-3 hours). The polymerization reaction temperature should be maintained at 80-84 C. by cooling as necessary. When the additions are completed, the monomer mixture and catalyst containers and feed lines are rinsed to the kettle with water. The batch was cooled to ambient temperature for dilution to 38% total solids, pH adjustment, and storage. The pH was adjusted with an aqueous ammonia/ammonium bicarbonate solution to pH 7.0 to 8.0 to improve the emulsion viscosity stability during storage and to compatibilize it with the other ingredients used in formulating the emulsion polymer into a polish.

Description of Materials Used in Aqueous Floor Polish Formulations of Example IV for Latex Compositions I-1, I-5, I-10, and IV-A (Order of addition shown)

| Material | Function | Supplier |
|---|---|---|
| Water | diluent | |
| FC-120 (1%) | wetting agent | (3M Company) |
| Kathon CG/ICP (1.5%) | biocide | (Rohm And Haas) |
| SWS-211 | defoamer | (Wacker Silicones) |
| Diethylene Glycol Ethyl Ether | coalescent | (Union Carbide) |
| Tributoxy Ethyl Phosphate | leveling aid | (FMC Company) |
| Polymer (30%) | vehicle | |
| SMA-2625 (25%) | alkali soluble/ swellable resin | (ARCO Chemical) |
| PED-371N (35%) | polyethylene wax emulsion | (Hoechst Wax) |
| AC-540N (30%) | polyethylene wax emulsion | (Allied Chemical) |
| Epolene E-43N (40%) | polypropylene wax emulsion | (Eastman Kodak) |
| AC-392N (35%) | polyethylene wax emulsion | (Allied Chemical) |

TABLE IV-1

Aqueous Floor Polish Formulations Employed in Example IV for Latex Composition I-1 (Order of addition shown)

| Polish Composition (Quantities in parts by weight) | IV-1 | IV-2 | IV-3 | IV-4 |
|---|---|---|---|---|
| Water | 14.1 | 12.6 | 15.3 | 14.1 |
| FC-120 (1%) | 1.0 | 1.0 | 1.0 | 1.0 |
| Kathon CG/ICP (1.5%) | 0.03 | 0.03 | 0.03 | 0.03 |
| SWS-211 | 0.02 | 0.02 | 0.02 | 0.02 |
| Diethylene Glycol | 9.0 | 9.0 | 9.0 | 9.0 |

TABLE IV-1-continued

Aqueous Floor Polish Formulations Employed in Example IV for Latex Composition I-1
(Order of addition shown)

| Polish Composition (Quantities in parts by weight) | IV-1 | IV-2 | IV-3 | IV-4 |
|---|---|---|---|---|
| Ethyl Ether | | | | |
| Tributoxy Ethyl Phosphate | 1.3 | 1.3 | 1.3 | 1.3 |
| Composition I-1 (30%) | 68.3 | 68.3 | 68.3 | 68.3 |
| SMA-2625 (15%) | 8.3 | 8.3 | 8.3 | 8.3 |
| PED-371N (35%) | 9.3 | 0.0 | 0.0 | 0.0 |
| AC-540N (30%) | 0.0 | 10.9 | 0.0 | 0.0 |
| Epolene E-43N (40%) | 0.0 | 0.0 | 8.1 | 0.0 |
| AC-392N (35%) | 0.0 | 0.0 | 0.0 | 9.3 |
| Formulation Constants: | | | | |
| Polymer/ASR/Wax Ratio | | | 82/5/13 | |
| Theoretical Non-Volatile Solids | | | 25% | |

TABLE IV-2

Aqueous Floor Polish Formulations Employed in Example IV for Latex Composition I-5
(Order of addition shown)

| Polish Composition (Quantities in parts by weight) | IV-5 | IV-6 | IV-7 | IV-8 |
|---|---|---|---|---|
| Water | 14.1 | 12.6 | 15.3 | 14.1 |
| FC-120 (1%) | 1.0 | 1.0 | 1.0 | 1.0 |
| Kathon CG/ICP (1.5%) | 0.03 | 0.03 | 0.03 | 0.03 |
| SWS-211 | 0.02 | 0.02 | 0.02 | 0.02 |
| Diethylene Glycol Ethyl Ether | 9.0 | 9.0 | 9.0 | 9.0 |
| Tributoxy Ethyl Phosphate | 1.3 | 1.3 | 1.3 | 1.3 |
| Composition I-5 (30%) | 68.3 | 68.3 | 68.3 | 68.3 |
| SMA-2625 (15%) | 8.3 | 8.3 | 8.3 | 8.3 |
| PED-371N (35%) | 9.3 | 0.0 | 0.0 | 0.0 |
| AC-540N (30%) | 0.0 | 10.9 | 0.0 | 0.0 |
| Epolene E-43N (40%) | 0.0 | 0.0 | 8.1 | 0.0 |
| AC-392N (35%) | 0.0 | 0.0 | 0.0 | 9.3 |
| Formulation Constants: | | | | |
| Polymer/ASR/Wax Ratio | | | 82/5/13 | |
| Theoretical Non-Volatile Solids | | | 25% | |

TABLE IV-3

Aqueous Floor Polish Formulations Employed in Example IV for Latex Composition I-10
(Order of addition shown)

| Polish Composition (Quantities in parts by weight) | IV-9 | IV-10 | IV-11 | IV-12 |
|---|---|---|---|---|
| Water | 28.5 | 27.0 | 29.7 | 28.5 |
| FC-120 (1%) | 1.0 | 1.0 | 1.0 | 1.0 |
| Kathon CG/ICP (1.5%) | 0.03 | 0.03 | 0.03 | 0.03 |
| SWS-211 | 0.02 | 0.02 | 0.02 | 0.02 |
| Diethylene Glycol Ethyl Ether | 9.0 | 9.0 | 9.0 | 9.0 |
| Tributoxy Ethyl Phosphate | 1.3 | 1.3 | 1.3 | 1.3 |
| Composition I-10 (38%) | 53.9 | 53.9 | 53.9 | 53.9 |
| SMA-2625 (15%) | 8.3 | 8.3 | 8.3 | 8.3 |
| PED-371N (35%) | 9.3 | 0.0 | 0.0 | 0.0 |
| AC-540N (30%) | 0.0 | 10.9 | 0.0 | 0.0 |
| Epolene E-43N (40%) | 0.0 | 0.0 | 8.1 | 0.0 |
| AC-392N (35%) | 0.0 | 0.0 | 0.0 | 9.3 |
| Formulation Constants: | | | | |
| Polymer/ASR/Wax Ratio | | | 82/5/13 | |
| Theoretical Non-Volatile Solids | | | 25% | |

TABLE IV-4

Aqueous Floor Polish Formulations Employed in Example IV for Latex Composition IV-A
(Order of addition shown)

| Polish Composition (Quantities in parts by weight) | IV-13 | IV-14 | IV-15 | IV-16 |
|---|---|---|---|---|
| Water | 28.5 | 27.0 | 29.7 | 28.5 |
| FC-120 (1%) | 1.0 | 1.0 | 1.0 | 1.0 |
| Kathon CG/ICP (1.5%) | 0.03 | 0.03 | 0.03 | 0.03 |
| SWS-211 | 0.02 | 0.02 | 0.02 | 0.02 |
| Diethylene Glycol Ethyl Ether | 9.0 | 9.0 | 9.0 | 9.0 |
| Tributoxy Ethyl Phosphate | 1.3 | 1.3 | 1.3 | 1.3 |
| IV-A (38%) | 53.9 | 53.9 | 53.9 | 53.9 |
| SMA-2625 (15%) | 8.3 | 8.3 | 8.3 | 8.3 |
| PED-371N (35%) | 9.3 | 0.0 | 0.0 | 0.0 |
| AC-540N (30%) | 0.0 | 10.9 | 0.0 | 0.0 |
| Epolene E-43N (40%) | 0.0 | 0.0 | 8.1 | 0.0 |
| AC-392N (35%) | 0.0 | 0.0 | 0.0 | 9.3 |
| Formulation Constants: | | | | |
| Polymer/ASR/Wax Ratio | | | 82/5/13 | |
| Theoretical Non-Volatile Solids | | | 25% | |

TABLE IV-5

Floor Wear Properties of Aqueous Floor Polishes Based on Compositions I-1, I-5, I-10, and IV-A

| Composition | Scuff Mark | Gloss after Machine Burnishing | Pad Scratching | Detergent Resistance | Film Removal/ Ease of Rem. |
|---|---|---|---|---|---|
| IV-5 | F-G | G-VG | Nil | VG | 100%/Good |
| IV-6 | Good | VG-Exc | Nil | VG | 100%/Good |
| IV-7 | P-F | Exc | Nil | VG | 100%/Good |
| IV-8 | VG | F-G | Nil | VG | 100%/Good |
| IV-1 | Fair | F-G | Moderate | Fair | 100%/VG |
| IV-2 | P-F | G-VG | Moderate | Fair | 100%/VG |
| IV-3 | Poor | G-VG | Slight | Fair | 100%/VG |
| IV-4 | G-VG | Fair | Moderate | Fair | 100%/VG |
| IV-9 | F-G | G-VG | Nil | VG | 100%/Exc |
| IV-10 | Good | VG-Exc | Nil | VG | 100%/Exc |
| IV-11 | P-F | Exc | Nil | VG | 100%/Exc |
| IV-12 | VG | F-G | Nil | VG | 100%/Exc |
| IV-13 | P-F | Fair | Moderate | Fair-Good | 100%/Exc |
| IV-14 | Poor | F-G | Moderate | Fair-Good | 100%/Exc |
| IV-15 | Poor | VG-Exc | Slight | Fair-Good | 100%/Exc |
| IV-16 | Good | P-F | Moderate | Fair-Good | 100%/Exc |

The crosslinking occurring during polish film formation with the aminosilane modification of the AAEM functionalized emulsion in composition I-5 of Example 1 provides the polishes formulated from composition I-5 (IV-5–IV-8) with improved resistance to pad scratching from floor machine burnishing operations compared to the non aminosilane modified emulsion in composition I-1 of Example 1 and the comparative metal-free floor polish emulsion in composition IV-A. The polishes formulated from the composition I-5 of Example 1 showed much better scuff mark resistance, gloss after machine burnishing, and detergent resistance than the non aminosilane modified polymer based on composition I-1, and the comparative metal-free floor polish emulsion in composition IV-A. The polishes formulated from the composition I-5 of Example 1 showed similar floor polish properties to the comparative zinc-containing emulsion based on composition I-10 of Example 1.

EXAMPLE V

Example V shows the enhancement of coating performance aminosilane modification brings to the precursor AAEM functionalized latex that contains zinc ion crosslinking.

Preparation of Precursor Latex

A polymer dispersion (precursor latex I-A) was prepared with the same composition and procedure as described in Example I, according to the technology taught in Canadian Patent 298,694, granted to Joseph M. Owens, et. al.

Precursor I-A was post treated with 3.3% by weight Zinc (calculated as metal on polymer solids), in the form of a tetra -amino Zinc Bicarbonate complex. The resulting metal crosslinked polymer (V-I) had a pH of 9.3 and had 38% total solids.

Preparation of Silicon-Modified Latex

A portion of composition V-1 was removed from the mixing vessel and further modified with amino silane as described in Example 1 to produce composition V-2 which has both zinc and silane modification. The ratio of silane, A0700, to AAEM was 1:1 mole. The silane-modified latex (V-2) was allowed to stand for 24 hours before it was formulated into a polish.

Testing of Polishes Based on Compositions V-I and V-2

To vinyl composition tiles, 2 coats of polishes based on compositions V-1 and V-2 were applied with about one hour between coats. After the final coat, the coated panels were allowed to cure at 25 degrees Centigrade for 24 hours before testing. The test results are displayed in Table V-1.

The crosslinking occurring during polish film formation with the aminosilane modification of the AAEM functionalized zinc containing emulsion in composition V-2 of Example V provides the polishes formulated from composition V-2 polymer with improved mar, and black heel mark and scuff resistance compared to the non silane modified zinc containing polymer based on composition V-1.

We claim:

1. A process for improving the mar resistance, scuff mark resistance, black heel mark resistance, and pad scratch resistance of a flooring substrate comprising applying to the substrate a composition comprising
    (a) polymer having acetoacetate groups comprising, as polymerized units,
        (i) from 0.5 to 95 percent by weight of acetoacetate-functional monomer; and
        (ii) from 5 to 25 percent by weight of acid-functional monomer; and
    (b) at least one amino-functional silane having amine moiety in an amount to provide from about 0.1 to about 1.0 mole of amine moiety per mole of acetoacetate groups.

2. The process of claim 1 wherein the polymer having acetoacetate groups comprises, as polymerized units, from 5 to 75 percent by weight of acetoacetate-functional monomer.

3. The process of claim 1 wherein the composition further comprises zinc.

4. The process of claim 1 wherein the acetoacetate-functional monomer is selected from the group consisting of acetoacetoxyethyl acrylate, acetoacetoxyethyl methacrylate, acetoacetoxypropyl methacrylate, allyl acetoacetate, acetoacetoxybutyl methacrylate and 2,3-di(acetoacetoxy)propyl methacrylate.

5. The process of claim 1 wherein the amino-functional silane is selected from the group consisting of trimethoxysilylpropyldiethylenetriamine, N-methylaminopropyltrimethoxysilane, aminoethylaminopropyhnethyldimethoxysilane, aminoethylaminopropyltrimethoxysilane (Dow Corning Z-6020), aminopropyhnethyldimethoxysilane, aminopropyltrimethoxysilane, polymeric aminoalkylsilicone, aminoethylaminoethylaminopropyl-trimethoxysilane, N-methylaminopropyltrimethoxysilane, methylaminopropyltrimethoxysilane, aminopropylmethyldiethoxysilane, aminopropyltriethoxysilane, 4-aminobutyltriethoxysilane, and oligomeric aminoalkylsilane.

TABLE V-1

Properties of Aqueous Floor Polishes Based on Composition V-1 and V-2

| Latex Composition | Detergent Resistance | Removability (Film Removal) | Mar Resistance | Black Heel Mark (% Coverage) | Scuff Mark (% Coverage) |
|---|---|---|---|---|---|
| V-1 | Exc | Exc (100%) | 2 | 2.9 | 5.0 |
| V-2 | Exc | Good (50%) | 1.5 | 1.5 | 3.4 |

* * * * *